United States Patent
Hirabayashi et al.

(10) Patent No.: US 9,604,521 B2
(45) Date of Patent: Mar. 28, 2017

(54) VEHICLE AND METHOD FOR CONTROLLING VEHICLE

(71) Applicant: Toyota Jidosha Kabushiki Kaisha, Toyota-shi, Aichi-ken (JP)

(72) Inventors: Hidekazu Hirabayashi, Chiryu (JP); Kunihiko Jinno, Toyota (JP); Hiroaki Matsumoto, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 182 days.

(21) Appl. No.: 14/662,958

(22) Filed: Mar. 19, 2015

(65) Prior Publication Data

US 2015/0298522 A1 Oct. 22, 2015

(30) Foreign Application Priority Data

Apr. 16, 2014 (JP) ................. 2014-084461

(51) Int. Cl.
 *B60H 1/00* (2006.01)
 *F02D 41/06* (2006.01)
 *F02N 11/04* (2006.01)
 *F02N 11/08* (2006.01)

(52) U.S. Cl.
 CPC ..... *B60H 1/00314* (2013.01); *B60H 1/00921* (2013.01); *F02D 41/068* (2013.01); *B60H 2001/00928* (2013.01); *F02D 2200/021* (2013.01); *F02D 2200/50* (2013.01); *F02D 2200/503* (2013.01); *F02D 2250/24* (2013.01); *F02N 11/04* (2013.01); *F02N 11/0829* (2013.01); *Y10S 903/903* (2013.01)

(58) Field of Classification Search
 None
 See application file for complete search history.

(56) References Cited

U.S. PATENT DOCUMENTS

| 9,327,578 B2* | 5/2016 | Itoh ................... B60H 1/00064 |
| 2006/0005557 A1 | 1/2006 | Takano et al. |
| 2010/0011789 A1* | 1/2010 | Carlson ................. B60H 1/004 62/158 |
| 2010/0175413 A1* | 7/2010 | Tsubone ............. B60H 1/00492 62/324.4 |
| 2012/0261110 A1 | 10/2012 | Katoh et al. |
| 2014/0250886 A1* | 9/2014 | Mizoguchi .............. F01K 23/10 60/663 |

(Continued)

FOREIGN PATENT DOCUMENTS

JP 2012-218463 A 11/2012

*Primary Examiner* — John R Olszewski
*Assistant Examiner* — Navid Ziaeianmehdizadeh
(74) *Attorney, Agent, or Firm* — Dinsmore & Shohl LLP

(57) ABSTRACT

A vehicle includes an engine, an engine cooling system configured to cool the engine with a coolant, an air conditioning apparatus, a heat exchanger that exchanges heat between the coolant and a refrigerant, and an ECU that controls the air conditioning apparatus. The air conditioning apparatus includes a compressor that compresses the refrigerant, and the compressor is driven in response to an air conditioning request to air condition a passenger compartment. Even in the absence of the air conditioning request, the ECU causes the compressor to be driven to heat the coolant by radiation of heat from the refrigerant.

14 Claims, 15 Drawing Sheets

(56) References Cited

U.S. PATENT DOCUMENTS

| | | | | |
|---|---|---|---|---|
| 2015/0047374 A1* | 2/2015 | Ulrey | B60S 1/023 | 62/79 |
| 2015/0102118 A1* | 4/2015 | Hirabayashi | B60H 1/004 | 237/12.3 R |
| 2015/0102119 A1* | 4/2015 | Hirabayashi | B60H 1/00657 | 237/28 |
| 2015/0105957 A1* | 4/2015 | Okamoto | B60W 10/30 | 701/22 |
| 2015/0251518 A1* | 9/2015 | Nemesh | B60H 1/00485 | 165/202 |
| 2015/0266392 A1* | 9/2015 | Arai | B60L 11/1874 | 320/150 |
| 2015/0338173 A1* | 11/2015 | Katoh | F28F 9/0278 | 165/172 |
| 2016/0159204 A1* | 6/2016 | Katoh | B60H 1/3211 | 62/185 |
| 2016/0318499 A1* | 11/2016 | Yamanaka | B60W 10/06 | |
| 2016/0332505 A1* | 11/2016 | Yamanaka | B60H 1/03 | |

* cited by examiner

FIG.3

|  | COMPARATIVE EXAMPLE | | PRESENT EMBODIMENT | |
|---|---|---|---|---|
|  | BEFORE COMPLETION OF WARM-UP | AFTER COMPLETION OF WARM-UP | BEFORE COMPLETION OF WARM-UP | AFTER COMPLETION OF WARM-UP |
| HEATING OPERATION | DRIVEN | STOPPED | DRIVEN | STOPPED |
| COOLING OPERATION | DRIVEN | DRIVEN | DRIVEN | DRIVEN |
| STOPPED | STOPPED | STOPPED | DRIVEN | STOPPED |

|  | CS MODE | | CD MODE | |
| --- | --- | --- | --- | --- |
|  | BEFORE COMPLETION OF WARM-UP | AFTER COMPLETION OF WARM-UP | BEFORE COMPLETION OF WARM-UP | AFTER COMPLETION OF WARM-UP |
| HEATING OPERATION | DRIVEN | STOPPED | DRIVEN | DRIVEN (PERMIT DRIVING) |
| COOLING OPERATION | DRIVEN | DRIVEN | DRIVEN | DRIVEN |
| STOPPED | DRIVEN (PERMIT DRIVING) | STOPPED (PROHIBIT DRIVING) | STOPPED (PROHIBIT DRIVING) | STOPPED (PROHIBIT DRIVING) |

PATH P : Tw > PREDETERMINED VALUE

PATH Q : Tw <= PREDETERMINED VALUE

VEHICLE AND METHOD FOR CONTROLLING VEHICLE

This nonprovisional application is based on Japanese Patent Application No. 2014-084461 filed on Apr. 16, 2014, with the Japan Patent Office, the entire contents of which are hereby incorporated by reference.

BACKGROUND OF THE INVENTION

Field of the Invention

The present invention relates to vehicles and methods for controlling vehicles, and more particularly to a vehicle including a cooling system for an internal combustion engine and an air conditioning apparatus, and a method for controlling the vehicle.

Description of the Background Art

Vehicles are known that are configured to perform heat exchange between the coolant of the engine and the refrigerant of the air conditioning apparatus. The air conditioning apparatus for vehicles disclosed in Japanese Patent Laying-Open No. 2012-218463, for example, radiates heat of the refrigerant of the air conditioning apparatus produced during a heating operation into the coolant of the engine to heat the coolant. In this way, by heating the engine coolant through effective use of the heat of the refrigerant, the engine can be quickly warmed up.

SUMMARY OF THE INVENTION

The engine warm-up control using the air conditioning apparatus as in Japanese Patent Laying-Open No. 2012-218463 is executed when an air conditioning request is present upon starting of the air conditioning apparatus by user operation. That is, it is determined whether or not the engine warm-up control is to be executed depending on user operation. As a result, if the user does not operate the air conditioning apparatus, the engine may not be warmed up for improved fuel efficiency.

The invention was made to solve the above-described problem, and an object of the invention is to provide a technique for allowing the fuel efficiency to be improved without depending on user operation, in a vehicle including a cooling system for an engine and an air conditioning apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram for comparing driving states of compressors between the heat pump system of the first embodiment and a heat pump system of a comparative example.

DESCRIPTION OF THE PREFERRED EMBODIMENTS

Figure 1:
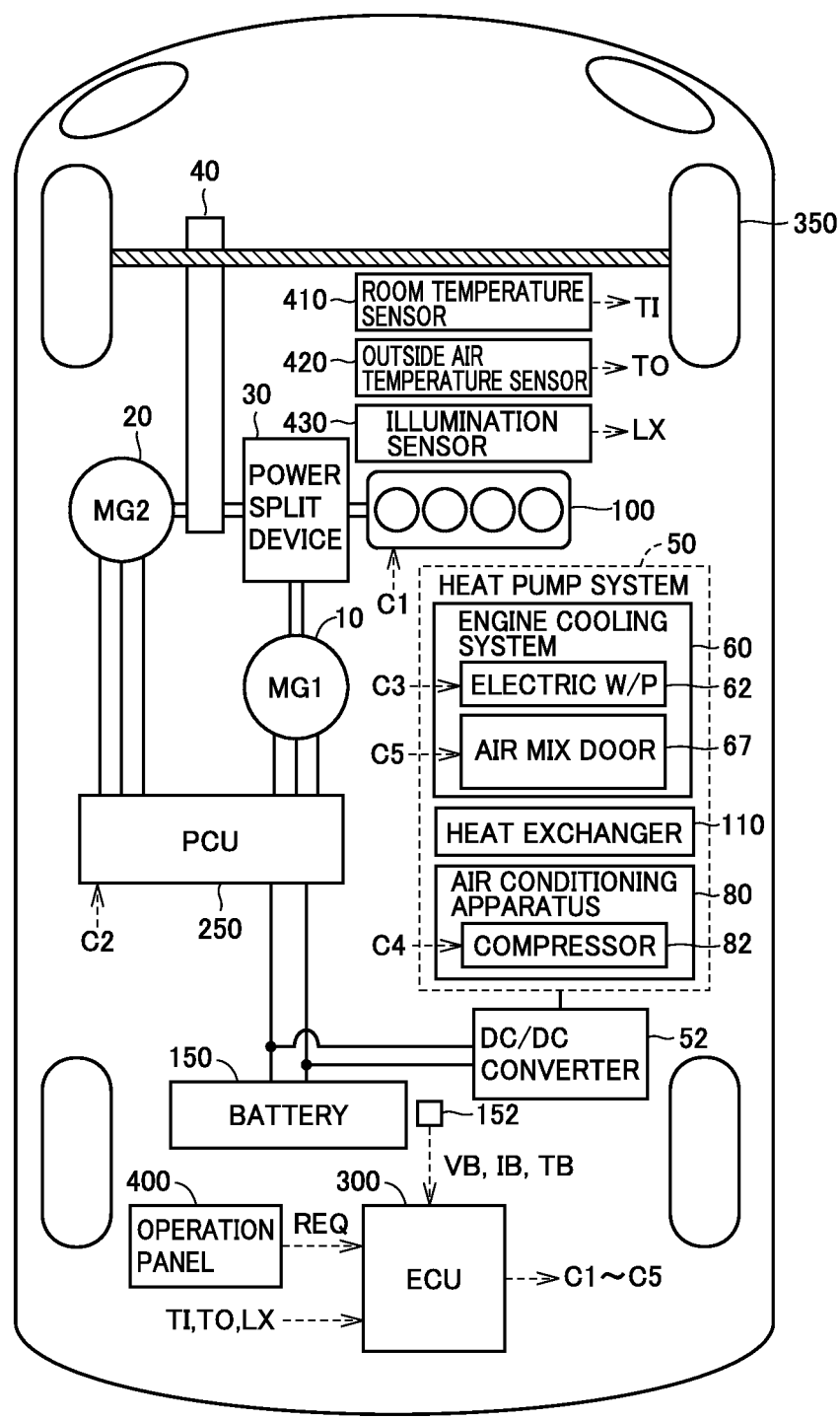
FIG. 1 is an overall block diagram schematically illustrating the configuration of a vehicle according to a first embodiment of the invention.

Embodiments of the present invention will be described below in detail with reference to the drawings, in which the same or corresponding elements are designated by the same reference characters, and description thereof will not be repeated.

First Embodiment

<Overall Configuration of Vehicle>

FIG. 1 is an overall block diagram schematically illustrating the configuration of a vehicle according to a first embodiment of the invention. Referring to FIG. 1, a vehicle 1, which is a hybrid vehicle, includes an engine 100, a motor generator 10 (MG1), a motor generator 20 (MG2), a power split device 30, a reduction gear 40, a battery 150, a PCU (Power Control Unit) 250, an ECU (Electronic Control Unit) 300, and a driving wheel 350.

Engine 100 is an internal combustion engine such as a gasoline engine, a diesel engine, or the like. Engine 100 outputs a driving force for causing vehicle 1 to run, based on a control signal C1 from ECU 300.

Each of motor generators 10 and 20 is, for example, a three-phase AC rotating electric machine including a rotor (not shown) in which a permanent magnet is embedded. Motor generator 10 starts engine 100 using the power of battery 150. Motor generator 10 can also generate power with the output of engine 100. AC power generated by motor generator 10 is converted by PCU 250 into DC power, which is charged into battery 150. The AC power generated by motor generator 10 may be supplied to motor generator 20.

Motor generator 20 generates a driving force using at least one of power supplied from battery 150 and power generated by motor generator 10. The driving force generated in motor generator 20 is transmitted to driving wheel 350. During regenerative braking of vehicle 1, kinetic energy of vehicle 1 is transmitted to motor generator 20 from driving wheel 350, causing motor generator 20 to be driven. AC power generated by motor generator 20 is converted by PCU 250 into DC power, which is charged into battery 150.

Power split device 30 is, for example, a planetary gear mechanism including a sun gear, a pinion gear, a carrier, and a ring gear (all not shown). Power split device 30 splits motive power generated by engine 100 into motive power to be transmitted to driving wheel 350 and motive power to be transmitted to motor generator 10. Reduction gear 40 transmits motive power from power split device 30 or motor generator 20 to driving wheel 350.

PCU 250 converts the DC power stored in battery 150 into AC power, based on a control signal C2 from ECU 300, and supplies the AC power to motor generators 10 and 20. PCU 250 converts AC power generated by motor generators 10 and 20 into DC power, and supplies the DC power to battery 150.

Battery 150 is a power storage device configured to be rechargeable. As battery 150, for example, a secondary battery such as a nickel hydride battery or a lithium ion battery, or a capacitor such as an electric double layer capacitor can be adopted.

Battery 150 is provided with a battery sensor 152. Battery sensor 152 collectively refers to a current sensor, a voltage sensor, and a temperature sensor (all not shown). The voltage sensor detects a voltage VB of battery 150. The current sensor detects a current IB input to and output from battery 150. The temperature sensor detects a temperature TB of battery 150. Each sensor outputs a detection result to ECU 300. ECU 300 estimates an SOC of battery 150, based on voltage VB, current IB, and temperature TB of battery 150.

Vehicle 1 further includes a heat pump system 50. Heat pump system 50 includes an engine cooling system 60, an air conditioning apparatus 80, and a heat exchanger 110 for performing heat exchange between engine cooling system 60 and air conditioning apparatus 80. The configuration of heat pump system 50 will be described in detail below.

Vehicle 1 also has an operation panel 400 for a user to select drive/stop, heating operation/cooling operation, and a set temperature of air conditioning apparatus 80. Upon the user's operation of operation panel 400 to drive air conditioning apparatus 80, an air conditioning request REQ is output to ECU 300.

Vehicle 1 further has a room temperature sensor 410 that detects a temperature TI in a passenger compartment (room temperature), an outside air temperature sensor 420 that detects a temperature TO of outside air (outside air temperature), and an illumination sensor 430 that detects an intensity of solar radiation LX.

ECU 300 includes a CPU (Central Processing Unit), a memory, and a buffer (all not shown). ECU 300 outputs a control signal, and controls each device to put vehicle 1 in a desired state, based on input of signals from the various sensors, as well as a map and a program stored in the memory.

<Engine Cooling System>

Figure 2:
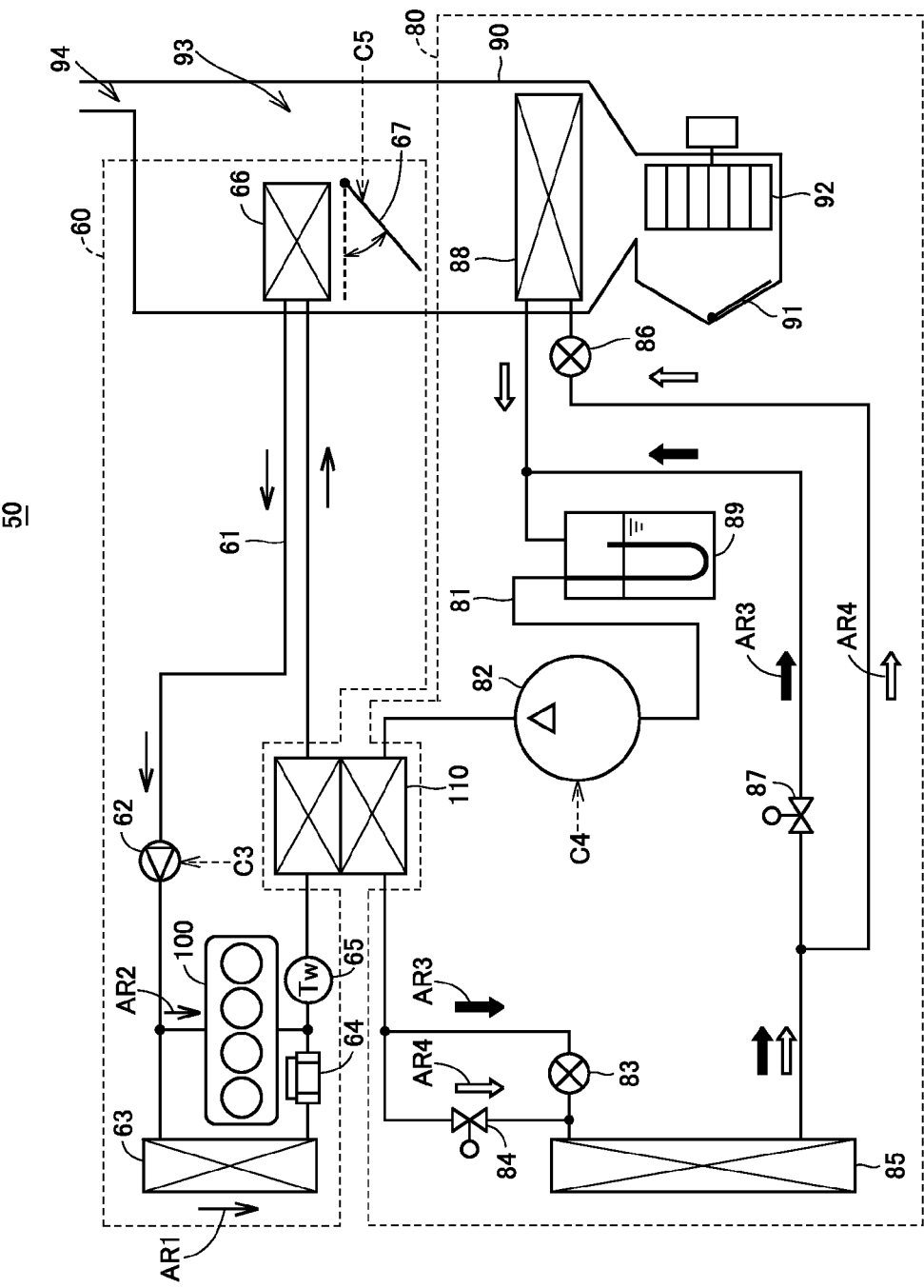
FIG. 2 is a block diagram illustrating in detail the configuration of the heat pump system shown in FIG. 1.

FIG. 2 is a block diagram illustrating in detail the configuration of heat pump system 50 shown in FIG. 1. Referring to FIG. 2, engine cooling system 60 is configured to cool engine 100 by causing the coolant in a coolant passage 61 to circulate. On the other hand, when the temperature of the coolant is higher than the temperature of engine 100, engine cooling system 60 can speed up warm-up of engine 100 by causing the coolant to circulate.

Coolant passage 61 has a water pump 62, a radiator 63, a thermostat 64, a water temperature sensor 65, a heat exchanger 110, and a heater core 66.

Water pump 62 is an electric pump for causing the coolant in coolant passage 61 to circulate. The rotation speed of the electric motor (not shown) of water pump 62 is controlled based on a control signal C3 from ECU 300.

Radiator 63 radiates the heat of the coolant to the outside air by heat exchange between the coolant passing through radiator 63 and the outside air.

The position of thermostat 64 is adjusted in accordance with the temperature of the coolant passing through thermostat 64. When a coolant temperature Tw is high, thermostat 64 is opened to form a path passing through radiator 63 (see the arrow AR1). This causes the heat of the coolant to be radiated to the outside air. On the other hand, when coolant temperature Tw is relatively low, such as immediately after the start of engine 100, thermostat 64 is closed to form a path not passing through radiator 63 (see arrow AR2).

Water temperature sensor 65 detects a temperature of the coolant (coolant temperature) Tw, and outputs the detection result to ECU 300. ECU 300 can determine whether or not warm-up of engine 100 has been completed, based on coolant temperature Tw.

Heater core 66 serves to perform heat exchange between the coolant passing through heater core 66 and air delivered into the passenger compartment. This causes the heat of the coolant to be radiated into the passenger compartment.

At an upstream side of heater core 66, air mix door 67 (adjusting unit) is provided for adjusting an amount of air passing through heater core 66. Details of control of air mix door 67 will be described below.

<Air Conditioning Apparatus>

Air conditioning apparatus 80 is configured to execute the heating operation or the cooling operation, by causing the refrigerant in a refrigerant passage 81 to circulate. Refrigerant passage 81 has a compressor 82, a heat exchanger 110, an expansion valve 83, an opening and closing valve 84, an outdoor unit 85, an expansion valve 86, an opening and closing valve 87, an evaporator 88, and an accumulator 89. A direction of refrigerant flow during the heating operation is indicated by arrow AR3, and a direction of refrigerant flow during the cooling operation is indicated by arrow AR4.

Compressor 82 compresses the refrigerant in refrigerant passage 81 to thereby send out the high-temperature high-pressure refrigerant. A rotation speed (hereinafter also referred to as the compressor rotation speed) Nc of the electric motor (not shown) of compressor 82 is controlled in response to a control signal C4 from ECU 300.

Expansion valve 83 and opening and closing valve 84 are provided in parallel with each other. When opening and closing valve 84 is closed, the refrigerant passes through expansion valve 83 where the refrigerant undergoes a pressure drop and expansion to be cooled. On the other hand, when opening and closing valve 84 is opened, the refrigerant bypasses expansion valve 83 to be led to outdoor unit 85. Outdoor unit 85 performs heat exchange between the refrigerant in refrigerant passage 81 and the outside air.

Similarly, expansion valve 86 and opening and closing valve 87 are provided in parallel with each other. When opening and closing valve 87 is closed, the refrigerant passes through expansion valve 86 where the refrigerant undergoes a pressure drop and expansion to be cooled. Evaporator 88 performs heat exchange between the refrigerant with a low temperature after undergoing a pressure drop and expansion and the air supplied into the passenger compartment. On the other hand, when opening and closing valve 87 is opened, the refrigerant bypasses expansion valve 86 to be led to accumulator 89. Accumulator 89 is a vapor-liquid separator in which the vapor and the liquid of the refrigerant are separated, and surplus refrigerant is stored.

<HVAC Unit>

An HVAC (Heating, Ventilation, and Air Conditioning) unit 90 is a unit that accommodates devices provided in the passenger compartment. HVAC unit 90 contains a switching device 91, a fan 92, evaporator 88, air mix door 67, heater core 66, a bypass channel 93, and an air outlet 94.

Switching device 91 is used for switching between the air in the passenger compartment and the outside air. Fan 92 blows air introduced via switching device 91 toward the inside of the passenger compartment. Bypass channel 93 is a passage for allowing the flow of air after passing through evaporator 88 to bypass heater core 66.

Air mix door 67 is provided at a downstream side of evaporator 88 and at an upstream side of heater core 66. An electric motor (not shown) for adjusting the position of air mix door 67 is controlled in response to a control signal C5 from ECU 300. Of the air after passing through evaporator 88, a ratio of an amount of air that passes through heater core 66 relative to an amount of air that passes through bypass channel 93 is adjusted in accordance with the position of air mix door 67. Then, the air after passing through heater core 66 and the air after passing through bypass channel 93 are mixed, and the mixed air is blown through air outlet 94 into the passenger compartment.

<Heating Operation>

During the heating operation, opening and closing valve 84 is closed while opening and closing valve 87 is opened. A circulating path of the refrigerant in refrigerant passage 81 thus becomes the path indicated by arrow AR3. The high-temperature high-pressure refrigerant compressed by compressor 82 radiates heat to the coolant in engine cooling system 60 by heat exchange in heat exchanger 110. The heat of the heated coolant is radiated by heater core 66, which causes the inside of passenger compartment to be heated. Moreover, the refrigerant undergoes a pressure drop and expansion through expansion valve 83 to be cooled once, and then the cooled refrigerant reaches outdoor unit 85. Outdoor unit 85 serves as a heat sink that causes the low-temperature refrigerant to absorb heat during the heating operation. The refrigerant heated by outdoor unit 85 passes through opening and closing valve 87 and accumulator 89, and returns to compressor 82.

As described above, heat pump system 50 is capable of executing the engine warm-up control to heat the coolant of engine 100 by heat exchange in heat exchanger 110. Furthermore, if warm-up of engine 100 has been completed, the coolant can be heated with the heat of engine 100. Note that coolant temperature Tw can also be increased using both the radiation of heat from engine 100 and the heat exchange in heat exchanger 110.

<Cooling Operation>

During the cooling operation, opening and closing valve 84 is opened while opening and closing valve 87 is closed. A circulating path of the refrigerant in refrigerant passage 81 thus becomes the path indicated by arrow AR4. The high-temperature high-pressure refrigerant compressed by compressor 82 reaches outdoor unit 85 by way of opening and closing valve 84. Outdoor unit 85 serves as a radiator that causes the high-temperature refrigerant to radiate heat during the cooling operation. The refrigerant cooled by outdoor unit 85 is further cooled through expansion valve 86. Air toward the inside of the passenger compartment is cooled by evaporator 88 performing heat exchange between the refrigerant and the air supplied into the passenger compartment.

Next, an exemplary technique of temperature adjustment during the heating operation and during the cooling operation will be described. First, ECU 300 calculates a target value of the temperature of the air blown through air outlet 94 (Target Airflow Temperature; TAO). Target airflow temperature TAO can be calculated, for example, based on the set temperature on operation panel 400, room temperature TI from room temperature sensor 410, outside air temperature TO from outside air temperature sensor 420, and the intensity of solar radiation LX from illumination sensor 430.

The memory of ECU 300 (not shown) stores the relationship between the target value of the temperature of evaporator 88 (Target Evaporation Temperature; TEO) and target airflow temperature TAO in the form of a map, for example. ECU 300 calculates target evaporation temperature TEO from target airflow temperature TAO, with reference to this map.

Evaporator 88 has a temperature sensor (not shown) that detects an airflow temperature Te from evaporator 88. ECU 300 executes feedback control such that the detection value of airflow temperature Te approaches the calculation value of target evaporation temperature TEO. Specifically, ECU 300 controls compressor rotation speed Nc by outputting, to compressor 82, control signal C4 in accordance with a deviation between airflow temperature Te and target evaporation temperature TEO. By means of this control of compressor rotation speed Nc and the above-described adjustment of the position of air mix door 67, the temperature of the air blown through air outlet 94 can be adjusted to a desired value.

The control of the present embodiment will now be described in comparison with control of a comparative example. Note that the vehicle and the heat pump system of the comparative example are equal in configuration to vehicle 1 shown in FIG. 1 and heat pump system 50 shown in FIG. 2, respectively, and thus, description thereof will not be repeated.

FIG. 3 is a diagram for comparing driving states (driven and stopped states) of compressors between heat pump system 50 of the first embodiment and the heat pump system of the comparative example.

Referring to FIG. 3, the compressor of the present embodiment and the compressor of the comparative example have equal driving states both during the heating operation and during the cooling operation. That is, during the heating operation, each compressor is driven before warm-up of the engine is completed to accelerate the engine warm-up, while the compressor is stopped after warm-up of the engine is completed. During the cooling operation, each compressor is driven regardless of whether the engine warm-up is completed or not.

On the other hand, the compressor of the first embodiment and the compressor of the comparative example, while the air conditioning apparatus is stopped, have different driving states. In the comparative example, while the air conditioning apparatus is stopped, the compressor remains in a stopped state. That is, while the air conditioning apparatus is stopped, the engine warm-up control to drive the compressor and heat the engine coolant is not executed.

In the comparative example, the engine warm-up control is executed during the heating operation or during the cooling operation, that is, only when the air conditioning apparatus is in operation. Generally, however, each of the heating operation and the cooling operation is initiated in response to the air conditioning request based on the user's operation, and hence, the engine warm-up control is not executed unless the user starts the air conditioning apparatus. That is, in the comparative example, it is determined whether or not the engine warm-up control is to be executed depending on the user's operation. As a result, if the user does not start the air conditioning apparatus, engine warm-up cannot be accelerated for improved fuel efficiency.

In the present embodiment, even while air conditioning apparatus 80 is stopped, the engine warm-up control is executed by driving compressor 82. Therefore, even while air conditioning apparatus 80 is stopped, the coolant of engine 100 is heated by heat exchange in heat exchanger 110, which allows quick warm-up of engine 100 for improved fuel efficiency.

Figure 4:
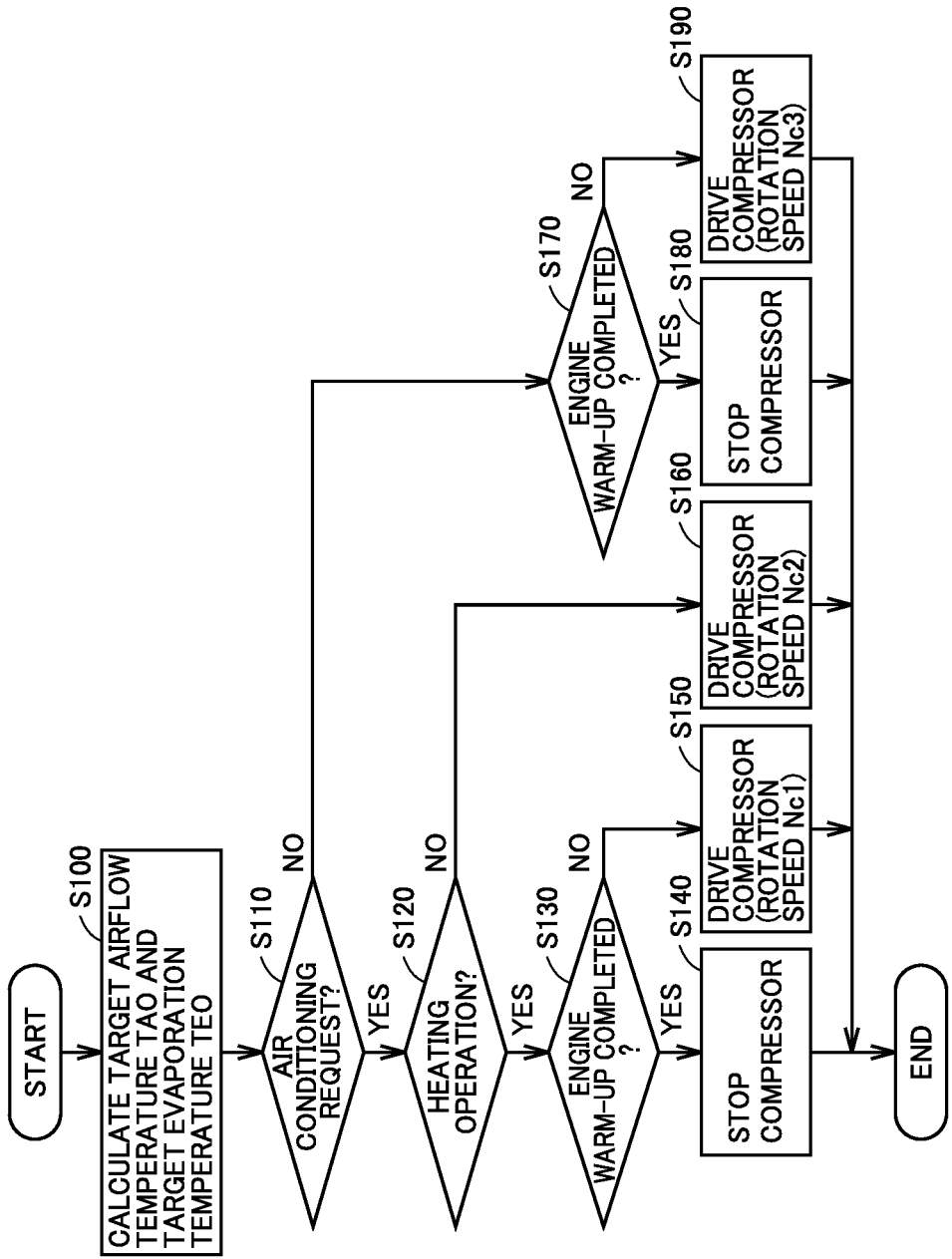
FIG. 4 is a flowchart for explaining heat pump system control processing of the first embodiment.

FIG. 4 is a flowchart for explaining control processing for heat pump system 50 of the first embodiment. This flowchart is invoked from a main routine every time a predetermined condition holds or every time a predetermined period passes, and then executed. Although each step in the flowchart is basically implemented by software processing by ECU 300, it may also be implemented by hardware processing, such as an electronic circuit fabricated in ECU 300.

Referring to FIGS. 1, 2, and 4, in Step (hereafter abbreviated as S) 100, ECU 300 calculates target airflow temperature TAO and target evaporation temperature TEO. ECU 300 calculates target airflow temperature TAO based on the set temperature or the like on operation panel 400, for example, and calculates target evaporation temperature TEO from target airflow temperature TAO, with reference to the map held in the memory.

In S110, ECU 300 determines the presence or absence of air conditioning request REQ from operation panel 400, that is, whether or not the user has selected the heating operation or the cooling operation of air conditioning apparatus 80.

If air conditioning request REQ is present (YES in S110), ECU 300 determines whether or not the heating operation has been selected (S120). If the heating operation has been selected (YES in S120), ECU 300 further determines the progress of warm-up of engine 100 (S130). Specifically, ECU 300 determines whether or not warm-up of engine 100 has been completed, based on coolant temperature Tw from water temperature sensor 65.

If warm-up of engine 100 is already completed (YES in S130), the coolant can be heated with engine 100 to ensure sufficient heating performance, and thus, it is unnecessary to execute the engine warm-up control. ECU 300 thus causes compressor 82 to be stopped (or maintained in a stopped state) (S140).

On the other hand, if warm-up of engine 100 is not completed yet (NO in S130), ECU 300 causes compressor 82 to be driven to execute the engine warm-up control (S150).

If the cooling operation is selected (NO in S120), ECU 300 causes compressor 82 to be driven regardless of whether warm-up of engine 100 is completed or not (S160). This is because compressor 82 must be driven for the cooling operation.

If air conditioning apparatus 80 is stopped (NO in S110), ECU 300 determines whether or not warm-up of engine 100 has been completed (S170). If warm-up of engine 100 is completed (YES in S170), ECU 300 does not need to warm up engine 100 any longer, and thus, causes compressor 82 to be stopped (S180).

On the other hand, if warm-up of engine 100 is not completed yet (NO in S170), ECU 300 causes compressor 82 to be driven to execute the engine warm-up control (S190).

As described above, in the present embodiment, even while air conditioning apparatus 80 is stopped, compressor 82 is driven to execute the engine warm-up control if engine warm-up is not completed yet (see S190). Therefore, even when air conditioning apparatus 80 is stopped, the coolant of engine 100 is heated by heat exchange in heat exchanger 110, which allows engine 100 to be quickly warmed up. As a result, fuel efficiency can be improved.

Note that the ability required for compressor 82 (the discharge amount of the refrigerant) varies depending on the driving state of air conditioning apparatus 80 (during the heating operation, during the cooling operation, and in the stopped state). In the present embodiment, appropriate compressor rotation speed Nc can be set in accordance with the driving state of air conditioning apparatus 80. A setting example of compressor rotation speed Nc in accordance with the driving state will be described below.

When the thermal load is great (for example, when the temperature of the coolant needs to be significantly increased because coolant temperature Tw is lower than a predetermined value), rotation speed Nc1 during the heating operation (see S150) is preferably set to be a value as high as possible (for example, a maximum permitted speed in consideration of the design of compressor 82), within a range of values where the user feels comfortable without the air blown from air conditioning apparatus 80 becoming excessively hot. This causes the temperature of the refrigerant to be increased rapidly, which also causes the amount of heat that is exchanged in heat exchanger 110 to increase. As a result, the time required for warm-up of engine 100 can be shortened.

Conversely, although setting compressor rotation speed Nc to a high value reduces the warm-up time of engine 100, energy consumption of compressor 82 increases. Thus, if an increase in energy consumption is desirably reduced, rotation speed Nc1 may be set to be lower than the maximum speed described above.

As one example, immediately after the start of the engine warm-up control, rotation speed Nc1 may be set to be relatively low, while rotation speed Nc1 may be increased after coolant temperature Tw has increased to some extent. During the period in which rotation speed Nc1 is set to be low, warm-up of engine 100 can be accelerated to some extent while reducing an increase in energy consumption. During the period in which rotation speed Nc1 is further increased, warm-up of engine 100 can be significantly accelerated even though energy consumption increases. In this way, adjusting rotation speed Nc1 allows the warm-up time of engine 100 to be shortened with an amount of energy consumption smaller than that at the maximum speed of rotation speed Nc1. At the same time, heating performance equal to or higher than that of conventional vehicles (vehicles not capable of the engine warm-up control using the air conditioning apparatus) can be ensured.

Moreover, as described above, rotation speed Nc2 (see S160) during the cooling operation, when the thermal load is great, is preferably set to a value as high as possible within a range of values where the user feels comfortable without the air blown from air conditioning apparatus 80 becoming excessively cold. This allows the warm-up time of engine 100 to be shortened.

Furthermore, while air conditioning apparatus 80 is stopped, since it is unnecessary to consider the heating performance or the cooling performance of air conditioning apparatus 80, the principal objective may be to improve fuel efficiency by warm-up of engine 100. Therefore, rotation speed Nc3 when air conditioning apparatus 80 is in the stopped state (see S190) may be preferably set to a value at which energy efficiency (COP: Coefficient Of Performance) of compressor 82 becomes the highest. This allows energy consumption of compressor 82 to be reduced most.

Modification of First Embodiment

In the first embodiment, rotation speed Nc1 during the heating operation (see S150 in FIG. 4) and rotation speed Nc2 during the cooling operation (see S160) are both determined based on target airflow temperature TAO and target evaporation temperature TEO. This is because it is necessary to perform feedback control using the temperature of the air at air outlet 94, in order to bring room temperature close to a temperature desirable to the user during the heating operation and during the cooling operation.

However, in determining rotation speed Nc3 (see S190) while air conditioning apparatus 80 is stopped, it is unnecessary to use the temperature of the air at air outlet 94 in consideration of air conditioning in the passenger compartment. In this modification of the first embodiment, compressor rotation speed Nc while air conditioning apparatus 80 is stopped is determined based on coolant temperature Tw.

Figure 5:
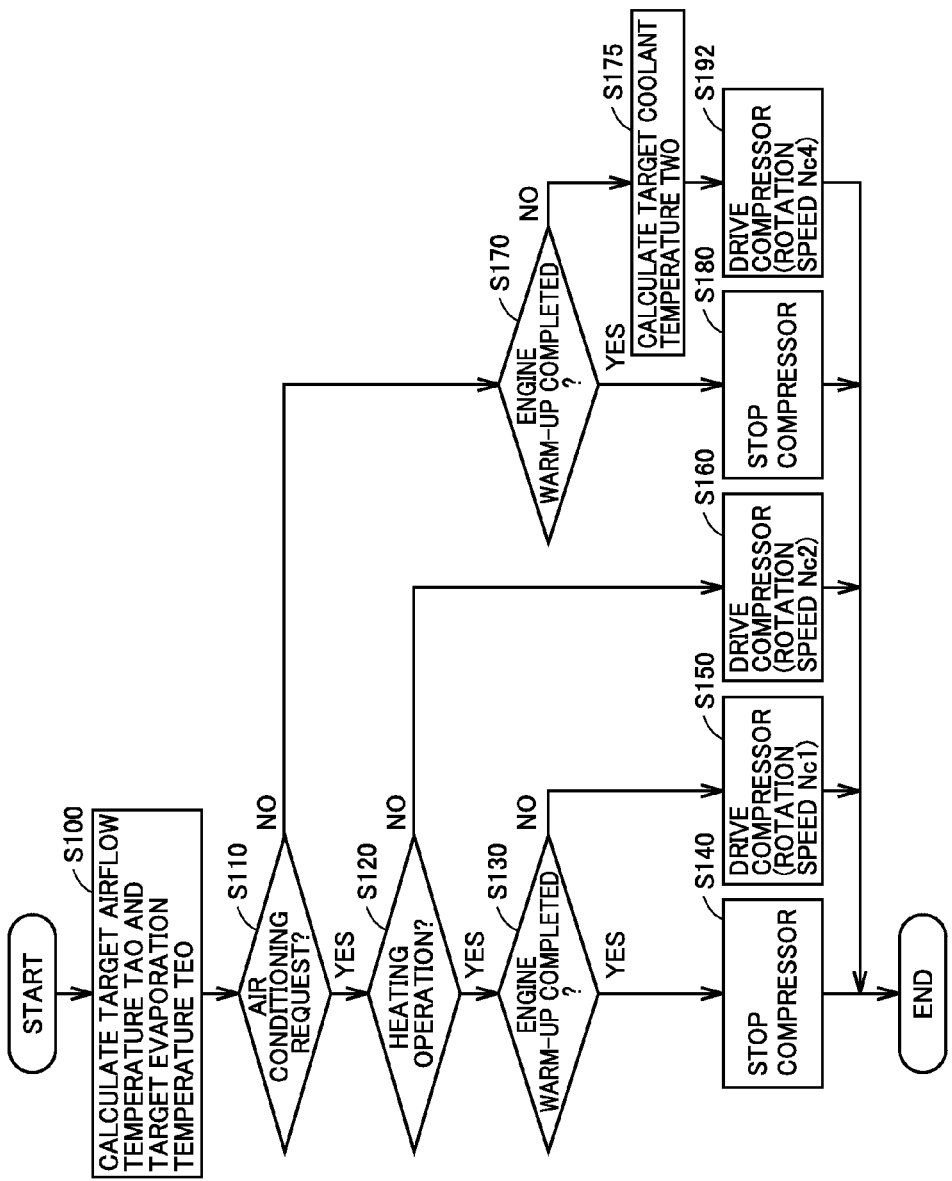
FIG. 5 is a flowchart for explaining heat pump system control processing of a modification of the first embodiment.

FIG. 5 is a flowchart for explaining control processing for heat pump system 50 of the modification of the first embodiment. Referring to FIG. 5, this flowchart differs from the flowchart shown in FIG. 4 in that it includes S175, and includes S192 instead of S190. Since the processing is otherwise equal to the processing shown in FIG. 4, detailed description thereof will not be repeated.

In S175, air conditioning request REQ is absent, and warm-up of engine 100 is not completed. In this case, ECU 300 calculates target value (target coolant temperature) TWO of coolant temperature Tw. ECU 300 then sets compressor rotation speed Nc to rotation speed Nc4 based on target coolant temperature TWO, and causes compressor 82 to be driven (S192).

If air conditioning request REQ is absent, since it is unnecessary to consider air conditioning in the passenger compartment, precedence can be given to warm-up of engine 100. The warm-up time of engine 100 can therefore be further shortened by controlling compressor rotation speed Nc based on coolant temperature Tw.

An implementation example of feedback control based on the target coolant temperature will now be described. First, target coolant temperature TWO required to warm up engine 100 is calculated. For example, ECU 300 holds a map representing the correspondence between outside air temperature TO and target coolant temperature TWO, and can calculate target coolant temperature TWO from a detection value of outside air temperature TO from outside air temperature sensor 420. ECU 300 then calculates a target value of the temperature of heat exchanger 110 (target heat exchanger temperature) required to realize target coolant temperature TWO, based on the predetermined map or a relational expression, for example.

Moreover, a refrigerant temperature sensor (not shown) that detects the temperature of the refrigerant is provided between compressor 82 and heat exchanger 110. ECU 300 performs feedback control of compressor 82 such that a deviation between a detection value of the refrigerant temperature from the refrigerant temperature sensor and the target heat exchanger temperature becomes small.

In this way, by heating the refrigerant such that the refrigerant temperature reaches the target heat exchanger temperature, the coolant can be heated to coolant temperature Tw required for warming up of engine 100. Note that the above-described control is not limited to the control based on coolant temperature Tw, so long as the progress of warm-up of engine 100 can be determined. The progress of the engine warm-up can also be determined based on, for example, an exhaust gas temperature, a temperature of a catalyst for purifying the exhaust gas, an engine oil temperature, or an elapsed time after putting engine 100 into operation. Furthermore, although it has been described that the refrigerant sensor detects the temperature of the refrigerant, because there is a correlation between the temperature and the pressure of the refrigerant, the temperature of the refrigerant may also be estimated from the pressure of the refrigerant using a pressure sensor.

Second Embodiment

Some hybrid vehicles have a plurality of driving modes. In the second embodiment, an example will be described in which the driving state of the compressor is determined based on the driving mode. Note that since the vehicle of the second embodiment is equal in configuration to vehicle 1 shown in FIG. 1, description thereof will not be repeated.

ECU 300 is configured to selectively set a CS (Charge Sustaining) mode in which the SOC of battery 150 is maintained in a predetermined range (or a predetermined value) or a CD (Charge Depleting) mode in which the SOC is consumed.

Figures 6, 7:
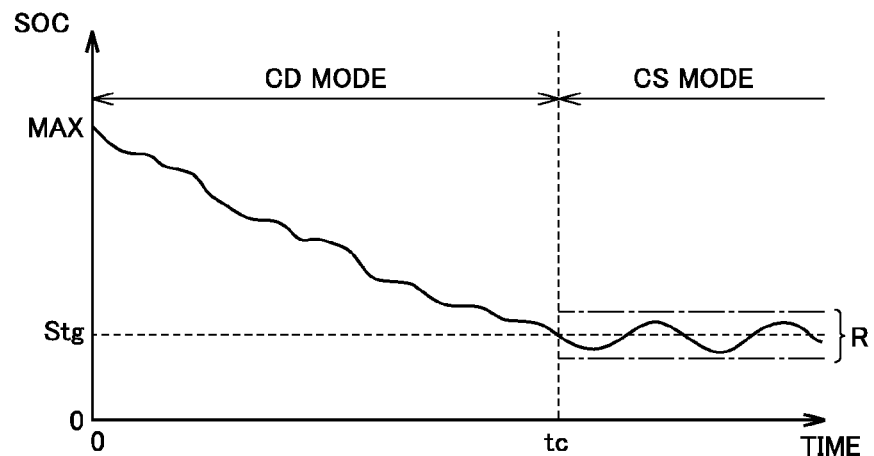
FIG. 6 is a diagram for explaining a CS mode and a CD mode.
FIG. 7 is a diagram for comparing driving states of a compressor of the second embodiment between the CS mode and the CD mode.

FIG. 6 is a diagram for explaining the CS mode and the CD mode. Referring to FIG. 6, the horizontal axis represents the temporal axis, and the vertical axis represents the SOC of battery 150.

The CD mode is basically a mode in which the power stored in battery 150 is consumed. During running in the CD mode, engine 100 is not started for the purpose of maintaining the SOC. The CS mode is a mode in which the SOC is maintained within a predetermined range. As one example, when the SOC decreases to a predetermined value Stg at time tc, the CS mode is selected, and thereafter the SOC is maintained in a control range R. In this way, in the CS mode, engine 100 is driven to maintain the SOC.

Note that the CD mode is not limited to EV running, which is running during which engine 100 is constantly shut down. Note that the CS mode is not limited to HV running, which is running during which engine 100 is constantly driven. The EV running and the HV running can be executed both in the CD mode and in the CS mode.

FIG. 7 is a diagram for comparing driving states of compressor 82 of the second embodiment between the CS mode and the CD mode. Referring to FIG. 7, compressor 82 in the CS mode has the same driving states as the driving states of compressor 82 in the first embodiment shown in FIG. 3.

In the case of the heating operation, the heating performance can be ensured with engine 100 in addition to air conditioning apparatus 80. In the CS mode, before warm-up of engine 100 is completed, compressor 82 is driven to warm up engine 100 while ensuring the heating performance. Since the frequency of starting engine 100 is high in the CS mode, engine 100 can be easily maintained in a warmed-up state. Therefore, once warm-up of engine 100 is completed, sufficient heating performance can typically be ensured with engine 100, so that compressor 82 can be stopped.

Conversely, in the CD mode, driving of compressor 82 is permitted even after the completion of warm-up of engine 100. As described above, in the CD mode, the EV running is mainly performed without starting engine 100 in order to maintain the SOC. Since engine 100 is not driven during the EV running, even if engine 100 is warmed up once, the temperature of engine 100 will gradually decrease. As a result, the heating performance may not be ensured. In this case, engine 100 can be started, even in the CD mode, in order to ensure the heating performance. It is, however, desirable to avoid starting engine 100 in this way in the CD mode as much as possible, since it deteriorates fuel efficiency.

In the second embodiment, therefore, during the heating operation in the CD mode, execution of the engine warm-up control is permitted even after the completion of engine warm-up. Since this prevents coolant temperature Tw from decreasing even if the EV running is continued, engine 100 can be maintained in a warmed-up state. As a result, it is unnecessary to put engine 100 into operation for the purpose of ensuring the heating performance, and hence, the fuel efficiency can be improved.

For the cooling operation, compressor 82 must be driven due to the principle of heat pump system 50. During the cooling operation, therefore, compressor 82 is driven regardless of the running mode, and also regardless of whether warm-up of engine 100 is completed or not.

On the other hand, while air conditioning is stopped, driving of compressor 82 is prohibited in the CD mode even before warm-up of engine 100 is completed. Since the EV running is mainly performed in the CD mode, warm-up of engine 100 is unlikely to lead to an improvement in fuel efficiency. In the present embodiment, since driving of compressor 82 is prohibited in the CD mode, consumption of energy for driving of compressor 82 can be prevented.

Conversely, in the CS mode, driving of compressor 82 is permitted if warm-up of engine 100 is not completed yet. In the CS mode, there is a relatively high probability of the HV running, in order to maintain the SOC in control range R. If, therefore, it is determined whether or not the engine warm-up control is executed depending on the user's operation, fuel efficiency may not be improved. Fuel efficiency can be improved by executing the engine warm-up control without depending on the user's operation.

Note that since a heating request from the user is absent while air conditioning is stopped, it is unnecessary to maintain engine 100 in a warmed-up state for the purpose of ensuring the heating performance after the completion of warm-up of engine 100. Therefore, whether in the CS mode or in CD mode, driving of compressor 82 is prohibited after the completion of warm-up of engine 100.

Figure 8:
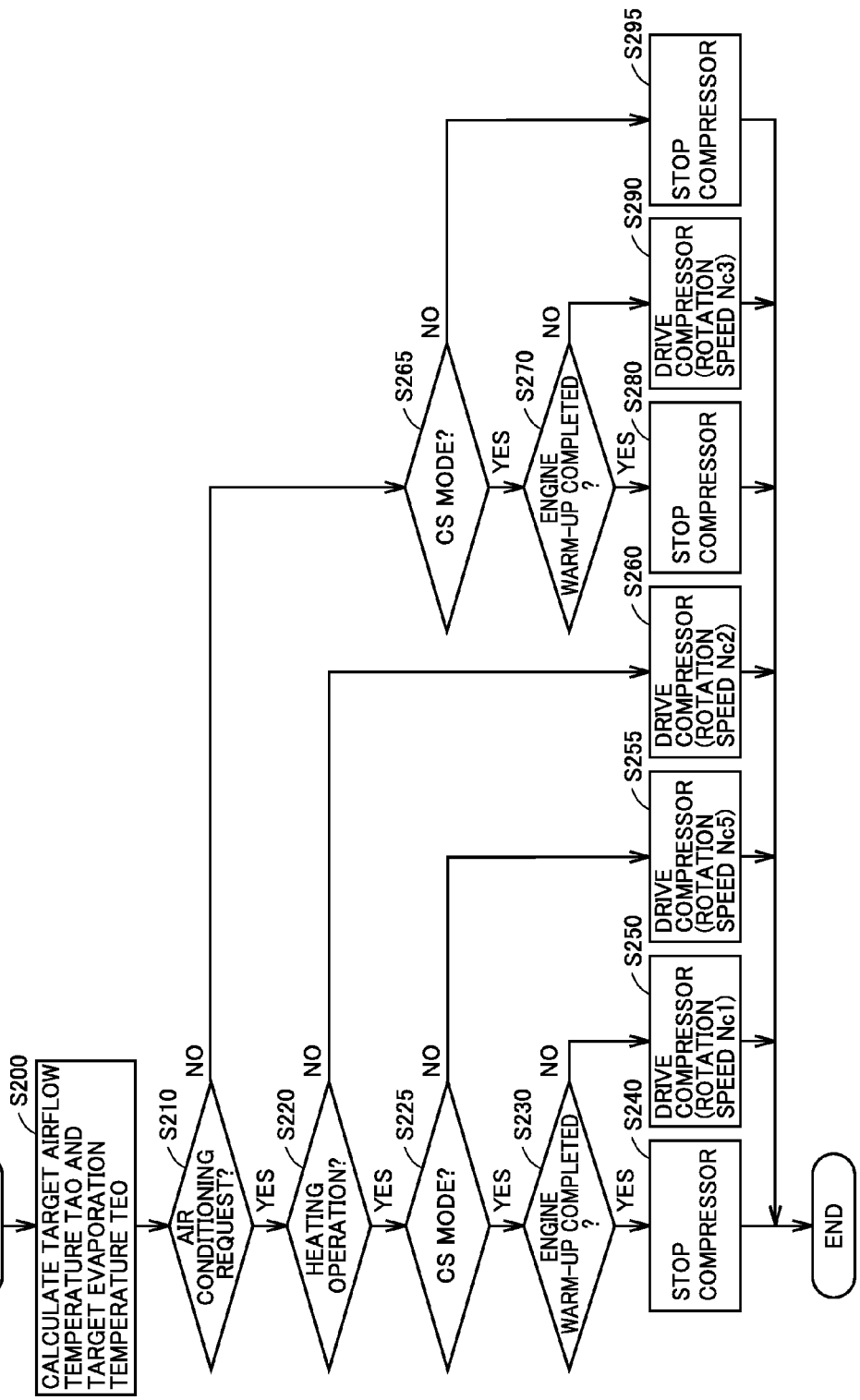
FIG. 8 is a flowchart for explaining heat pump system control processing of the second embodiment.

FIG. 8 is a flowchart for explaining control processing for heat pump system 50 of the second embodiment. Referring to FIG. 8, the processing in S200, S210, and S220 is the same as the processing in S100, S110, and S120, respectively, shown in FIG. 4, and thus, description thereof will not be repeated.

If air conditioning request REQ is present, and also the heating operation has been selected, ECU 300 determines in S225 whether or not the driving mode is the CS mode. If the driving mode is the CS mode (YES in S225), ECU 300 determines whether or not warm-up of engine 100 has been completed (S230).

If warm-up of engine 100 is already completed (YES in S230), the coolant can be heated with engine 100 to ensure sufficient heating performance, and thus, ECU 300 causes compressor 82 to stop (S240).

On the other hand, if warm-up of engine 100 is not completed yet (NO in S230), ECU 300 permits driving of compressor 82 to execute the engine warm-up control (S250). Specifically, when in the CS mode, ECU 300 causes compressor 82 and water pump 62 to be driven regardless of whether vehicle 1 is during the HV running or the EV running. At this time, ECU 300 sets compressor rotation speed Nc to rotation speed Nc1.

If the driving mode is the CD mode (NO in S225), ECU 300 sets compressor rotation speed Nc to rotation speed Nc5, and causes compressor 82 to be driven, regardless of whether warm-up of engine 100 is completed or not (S255). Rotation speed Nc5 may be equal to or different from rotation speed Nc1. In this way, engine 100 is warmed up if warm-up of engine 100 has not been completed yet. Alternatively, if warm-up of engine 100 is already completed, the current state is maintained. As a result, starting of engine 100 for the purpose of ensuring the heating performance can be avoided.

If the cooling operation is selected (NO in S220), the processing is moved to S260. Since the processing in S260 is the same as the processing in S160 shown in FIG. 4, description thereof will not be repeated.

Furthermore, if air conditioning request REQ is absent (NO in S210), ECU 300 determines whether or not the driving mode is the CS mode (S265). If the driving mode is the CS mode (YES in S265), ECU 300 determines whether or not warm-up of engine 100 has been completed (S270).

If warm-up of engine 100 is already completed (YES in S270), ECU 300 in the CS mode does not need to warm up engine 100 any longer, and thus, prohibits driving of compressor 82 (S280). On the other hand, if warm-up of engine 100 is not completed yet (NO in S270), ECU 300 causes compressor 82 to be driven to execute the engine warm-up control (S290).

On the other hand, if the driving mode is the CD mode (NO in S265), ECU 300 prohibits driving of compressor 82 (S295). Since the probability of the EV running is high in the CD mode, warm-up of engine 100 is unlikely to lead to an improvement in fuel efficiency. Moreover, since an air conditioning request is absent, it is unnecessary to ensure the heating performance. In the present embodiment, since driving of compressor 82 is prohibited in the CD mode, consumption of energy for driving of compressor 82 can be prevented.

Third Embodiment

In the third embodiment, a configuration will be described that allows the engine to be warmed up more quickly than in the first and second embodiments, by switching the coolant path.

Figure 9:
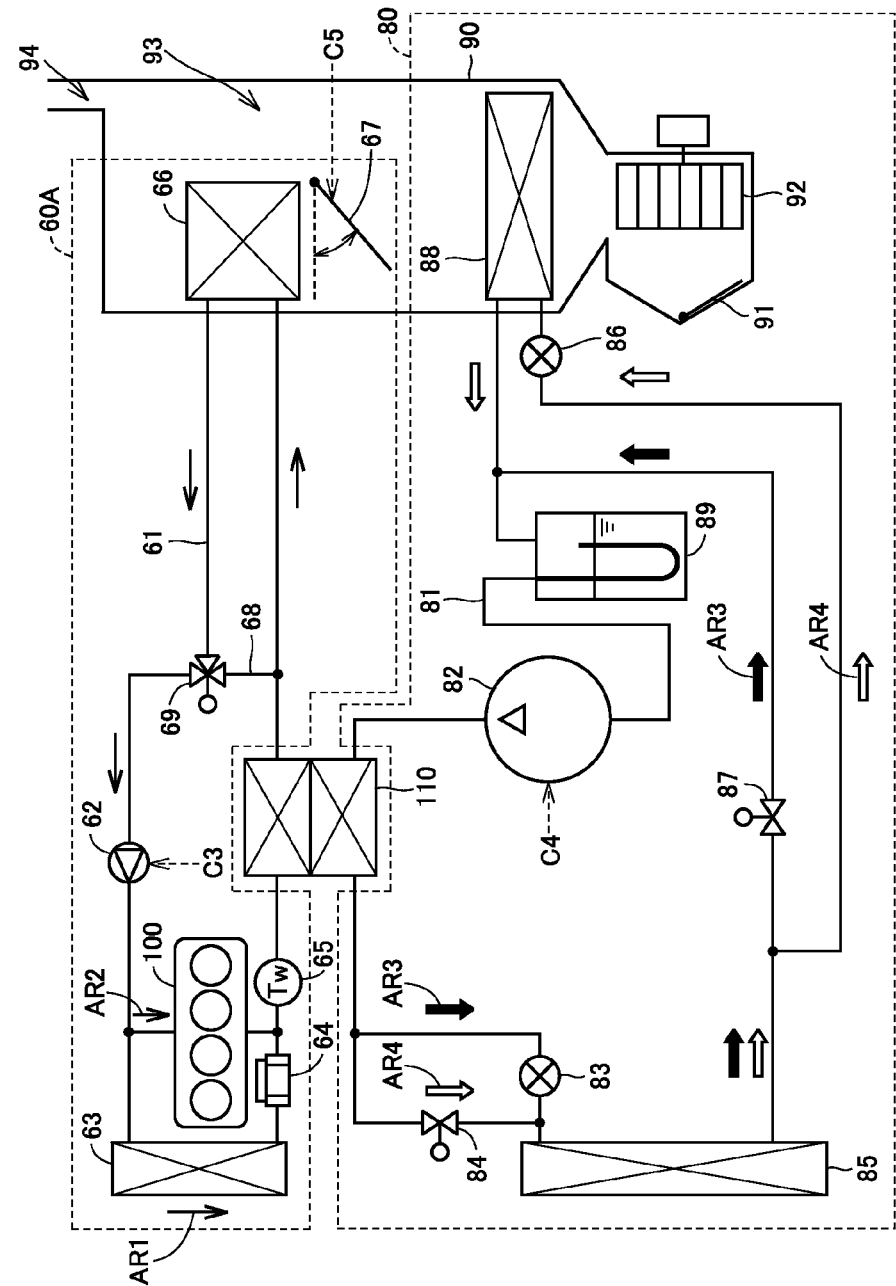
FIG. 9 is a block diagram illustrating in detail the configuration of a heat pump system of a third embodiment.

FIG. 9 is a block diagram illustrating the configuration of a heat pump system of the third embodiment. Referring to FIG. 9, heat pump system 50A differs from heat pump system 50 shown in FIG. 2 in that a bypass path 68 and a cross valve 69 are provided along coolant passage 61. Since other elements of heat pump system 50A are equal to corresponding elements of heat pump system 50, description thereof will not be repeated.

In the third embodiment, the cooling operation has a high mode and a low mode. The position of each of cross valve 69 and air mix door 67 is controlled in accordance with a driving state of air conditioning apparatus 80 (the heating operation, the cooling operation in a high mode, the cooling operation in a low mode, and the stopped state).

Figure 10A:
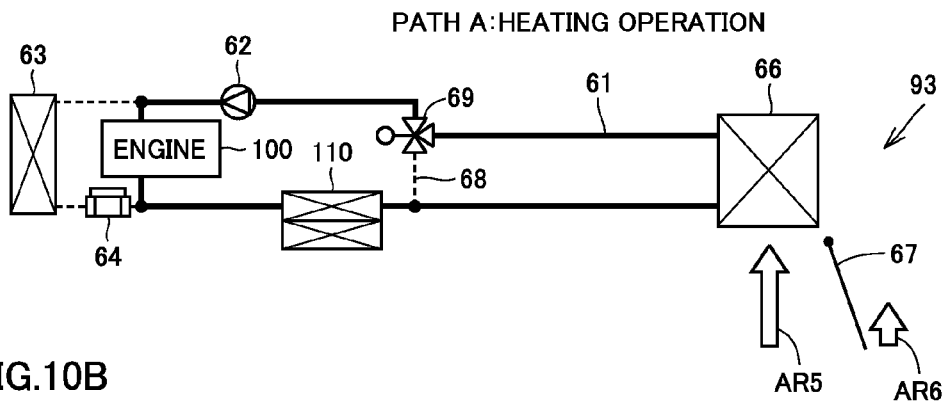
FIG. 10A is a diagram for explaining a coolant path and an air mix door position during a heating operation of the air conditioning apparatus.
Figure 10B:
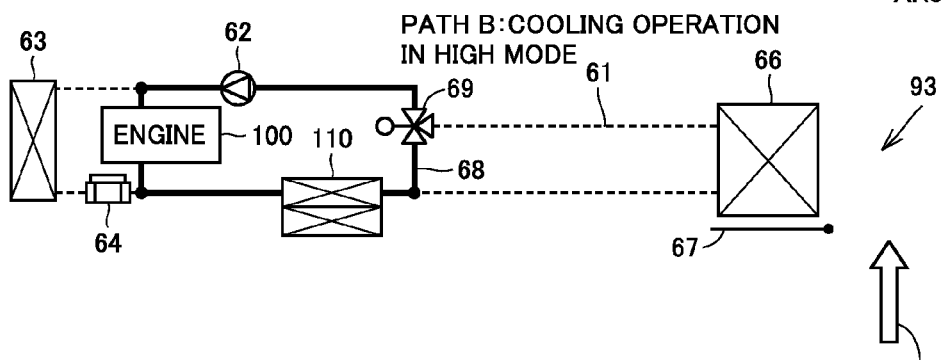
FIG. 10B is a diagram for explaining a coolant path and an air mix door position during a cooling operation in a high mode of the air conditioning apparatus.
Figure 10C:
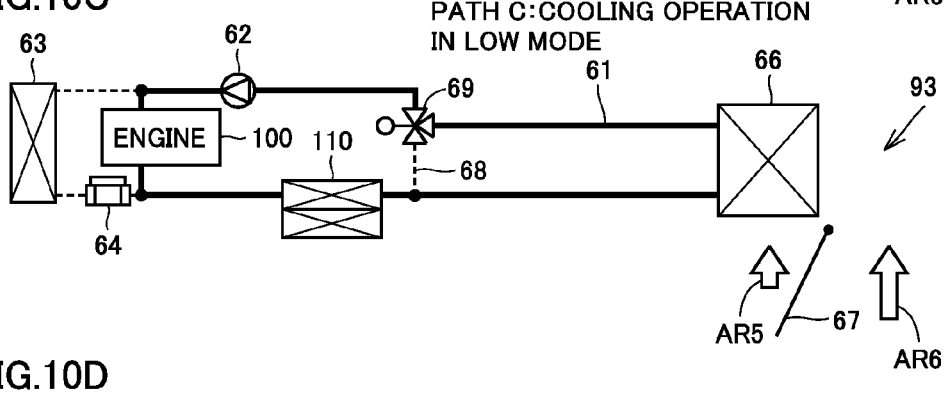
FIG. 10C is a diagram for explaining a coolant path and an air mix door position during a cooling operation in a low mode of the air conditioning apparatus.
Figure 10D:
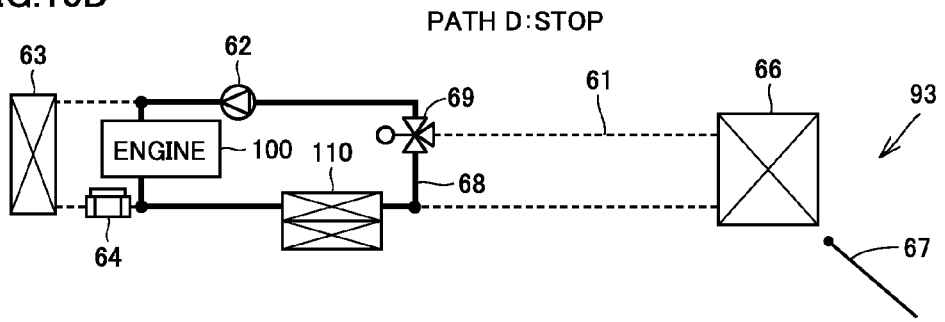
FIG. 10D is a diagram for explaining a coolant path and an air mix door position while the air conditioning apparatus is stopped.

FIGS. 10A to 10D are each a diagram for explaining a coolant path and a position of air mix door 67 in accordance with the driving state of air conditioning apparatus 80. FIG. 10A shows a state during the heating operation. FIG. 10B shows a state during the cooling operation in the high mode. FIG. 10C shows a state during the cooling operation in the low mode. FIG. 10D shows a state while air conditioning apparatus 80 is stopped. Note that the coolant path in each of the driving states is indicated by the thick line. Moreover, air passing through heater core 66 is indicated by arrow AR5, and air passing through bypass channel 93 is indicated by arrow AR6.

As shown in FIGS. 10B and 10D, bypass path 68 is formed to allow the coolant to circulate along a path through which the coolant does not flow through heater core 66. Cross valve 69 (switching unit) switches the flow of the coolant to either one of heater core 66 and bypass path 68. Instead of cross valve 69, two opening and closing valves may be provided.

Cross valve 69 during the heating operation is controlled such that the coolant flows through heater core 66 (see path A). Moreover, the temperature of air blown into the passenger compartment is adjusted by adjusting the position of air mix door 67.

Cross valve 69 during the cooling operation in the high mode is controlled such that the coolant flows through bypass path 68 (see path B). Air mix door 67 is controlled such that the air into the passenger compartment does not pass through heater core 66. That is, the position of air mix door 67 is set to zero.

Cross valve 69 during the cooling operation in the low mode is controlled such that the coolant flows through heater core 66 (see path C). Air mix door 67 is controlled such that part of the air into the passenger compartment is led into heater core 66 while the other part of the air is led into bypass channel 93, whereby the temperature is adjusted.

Cross valve 69 while air conditioning apparatus 80 is stopped is controlled such that the coolant flows through bypass path 68 (see path D). Note that the position of air mix door 67 is not particularly limited, and air mix door 67 may be either in an opened or closed state.

Figure 11:
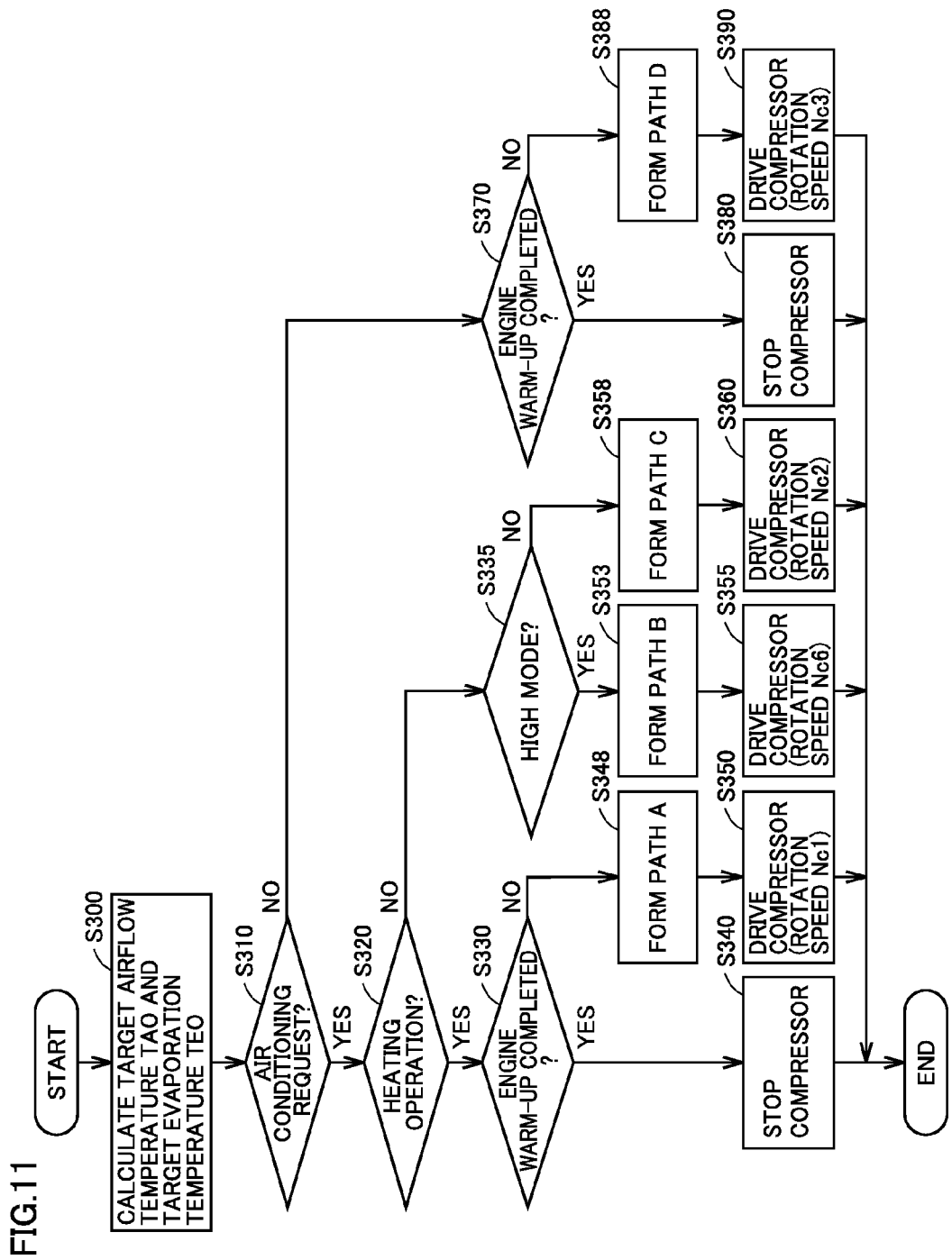
FIG. 11 is a flowchart for explaining heat pump system control processing of the third embodiment.

FIG. 11 is a flowchart for explaining control of heat pump system 50A of the third embodiment. Referring to FIGS. 10A to 10D and FIG. 11, the processing in S300 to S340 is the same as the processing in S100 to S140, respectively, shown in FIG. 4, and thus, description thereof will not be repeated.

If warm-up of engine 100 is not completed (NO in S330), ECU 300 controls cross valve 69 to form path A (S348). ECU 300 also controls air mix door 67 such that air after passing through evaporator 88 passes through heater core 66. ECU 300 then sets compressor rotation speed Nc to rotation speed Nc1, causes compressor 82 to be driven, and executes the engine warm-up control (S350).

If the cooling operation is being requested (NO in S320), ECU 300 determines whether the cooling operation is in the high mode or in the low mode (S335).

If the cooling operation is in the high mode (YES in S335), ECU 300 sets the position of air mix door 67 to zero such that the air after passing through evaporator 88 will not flow into heater core 66. As a result, the air passes through bypass channel 93, so that it is unnecessary to cause the coolant to flow through heater core 66. ECU 300 therefore controls cross valve 69 to form path B through which the coolant does not flow through heater core 66 (S353). In other words, if ECU 300 controls air mix door 67 such that the air blown into the passenger compartment does not pass through heater core 66, cross valve 69 is controlled such that the coolant flows through bypass path 68. ECU 300 then sets compressor rotation speed Nc to rotation speed Nc6, and causes compressor 82 to be driven (S355). Rotation speed Nc6 is preferably higher than rotation speed Nc2 in the low mode.

On the other hand, if the cooling operation is in the low mode (NO in S335), ECU 300 controls air mix door 67 such that part of the air after passing through evaporator 88 passes through heater core 66, and the other part of the air passes through bypass channel 93. ECU 300 therefore controls cross valve 69 to form path C through which the coolant flows through heater core 66 (S358). In other words, if ECU 300 controls air mix door 67 such that part of the air blown into the passenger compartment passes through heater core 66, ECU 300 controls cross valve 69 such that the coolant flows through heater core 66. ECU 300 then sets compressor rotation speed Nc to rotation speed Nc2, and causes compressor 82 to be driven (S360).

The processing to be performed in S380 if air conditioning request REQ is absent and warm-up of engine 100 is completed (NO in S310 and YES in S370) is the same as the processing in S180 shown in FIG. 4, and thus, description thereof will not be repeated.

If warm-up of engine 100 is not completed (NO in S370), air conditioning apparatus 80 is stopped, and no air flows through heater core 66, and therefore, it is unnecessary to pass the coolant through heater core 66. ECU 300 therefore controls cross valve 69 to form path D through which the coolant does not flow through heater core 66 (S388). ECU 300 then sets compressor rotation speed Nc to rotation speed Nc3, causes compressor 82 to be driven, and executes the engine warm-up control (S390).

As described above, in the present embodiment, if there is no need to pass the coolant through heater core 66, cross valve 69 is controlled to form paths (paths B and D) through which the coolant flows through bypass path 68 instead of heater core 66. This decreases the amount of the coolant required for warm-up of engine 100, thereby allowing coolant temperature Tw to rise easily. Consequently, engine 100 can be warmed up more quickly.

Fourth Embodiment

If the SOC of the battery decreases due to driving of the compressor while the engine is shut down with engine warm-up being completed, the engine may be started in order to recover the SOC. It is desirable to avoid such starting of the engine due to driving of the compressor, since it leads to deterioration of fuel efficiency. Thus, in the fourth embodiment, compressor rotation speed Nc is changed in accordance with the SOC. More specifically, the compressor rotation speed is set to be lower as the SOC decreases. This allows power consumption of the compressor to be smaller as the SOC becomes lower, which reduces the decreasing rate of the SOC. As a result, the engine becomes unlikely to be started.

Figure 12:
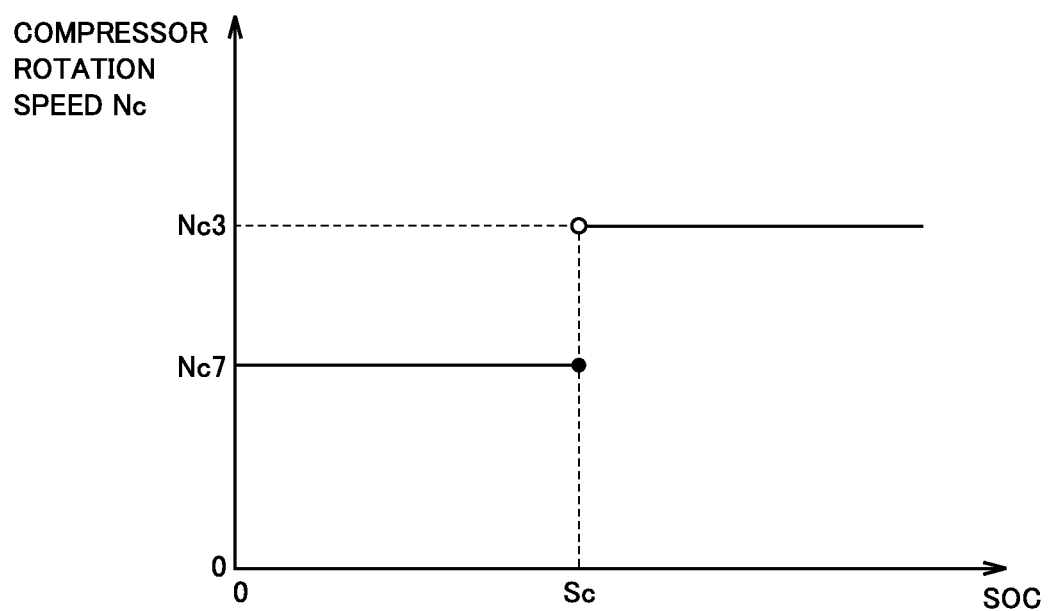
FIG. 12 is a diagram for explaining the relationship between the SOC of a battery and the compressor rotation speed.

FIG. 12 is a diagram for explaining the relationship between the SOC of battery 150 and compressor rotation speed Nc. Referring to FIG. 12, the horizontal axis represents the SOC, and the vertical axis represents compressor rotation speed Nc. If the SOC is equal to or higher than a predetermined value Sc, compressor rotation speed Nc is set to Nc3. On the other hand, if the SOC is lower than predetermined value Sc, compressor rotation speed Nc is set to Nc7, which is smaller than Nc3.

Figure 13:
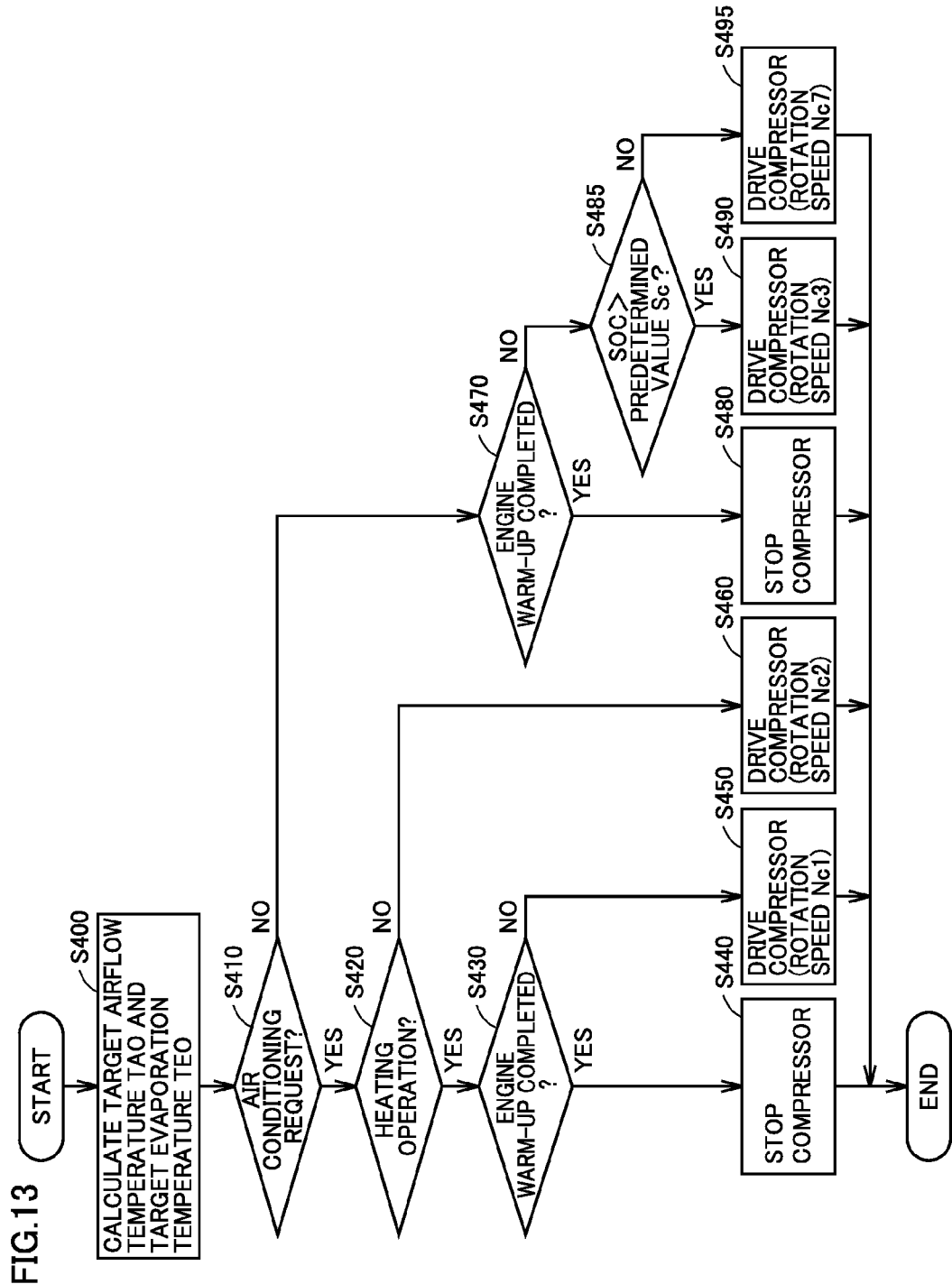
FIG. 13 is a flowchart for explaining heat pump system control processing of a fourth embodiment.

FIG. 13 is a flowchart for explaining control processing for heat pump system 50 of the fourth embodiment. Referring to FIGS. 2, 12 and 13, the processing in S400 to S480 is the same as the processing in S100 to S180, respectively, shown in FIG. 4, and thus, description thereof will not be repeated.

If warm-up of engine 100 is not completed yet in S470 (NO in S470), ECU 300 determines whether or not the SOC of battery 150 is higher than predetermined value Sc (S485).

If the SOC is higher than predetermined value Sc (YES in S485), it is unlikely that engine 100 will be started for SOC recovery, and thus, ECU 300 sets compressor rotation speed Nc to Nc3 (S490).

On the other hand, if the SOC is equal to or lower than predetermined value Sc (NO in S485), it is unlikely that engine 100 will be started if the SOC further decreases, and thus, ECU 300 sets compressor rotation speed Nc to Nc7, which is lower than Nc3 (S495).

As described above, in the present embodiment, if the SOC of battery 150 is equal to or lower than predetermined value Sc, compressor rotation speed Nc is set to be lower than that where the SOC is higher than predetermined value Sc. This allows power consumption of compressor 82 to be smaller, which reduces the decreasing rate of the SOC. As a result, the possibility of engine 100 being started for SOC recovery can be reduced.

Note that with FIG. 12, the example has been described in which when the SOC of battery 150 becomes equal to or lower than predetermined value Sc, compressor rotation speed Nc is changed to stepwise decrease. The manner in which compressor rotation speed Nc is changed, however, is not limited to the above, so long as compressor rotation speed Nc is set to be lower as the SOC becomes lower. Compressor rotation speed Nc may be changed to decrease in the form of a straight line or a curve as the SOC decreases. Furthermore, if the SOC is equal to or lower than predetermined value Sc, compressor rotation speed Nc may be set to zero to prohibit driving of compressor 82.

Fifth Embodiment

In the present embodiment, control to switch the coolant path for ensuring both quick warm-up of the engine and the heating performance of the air conditioning apparatus will be described.

Figure 14:
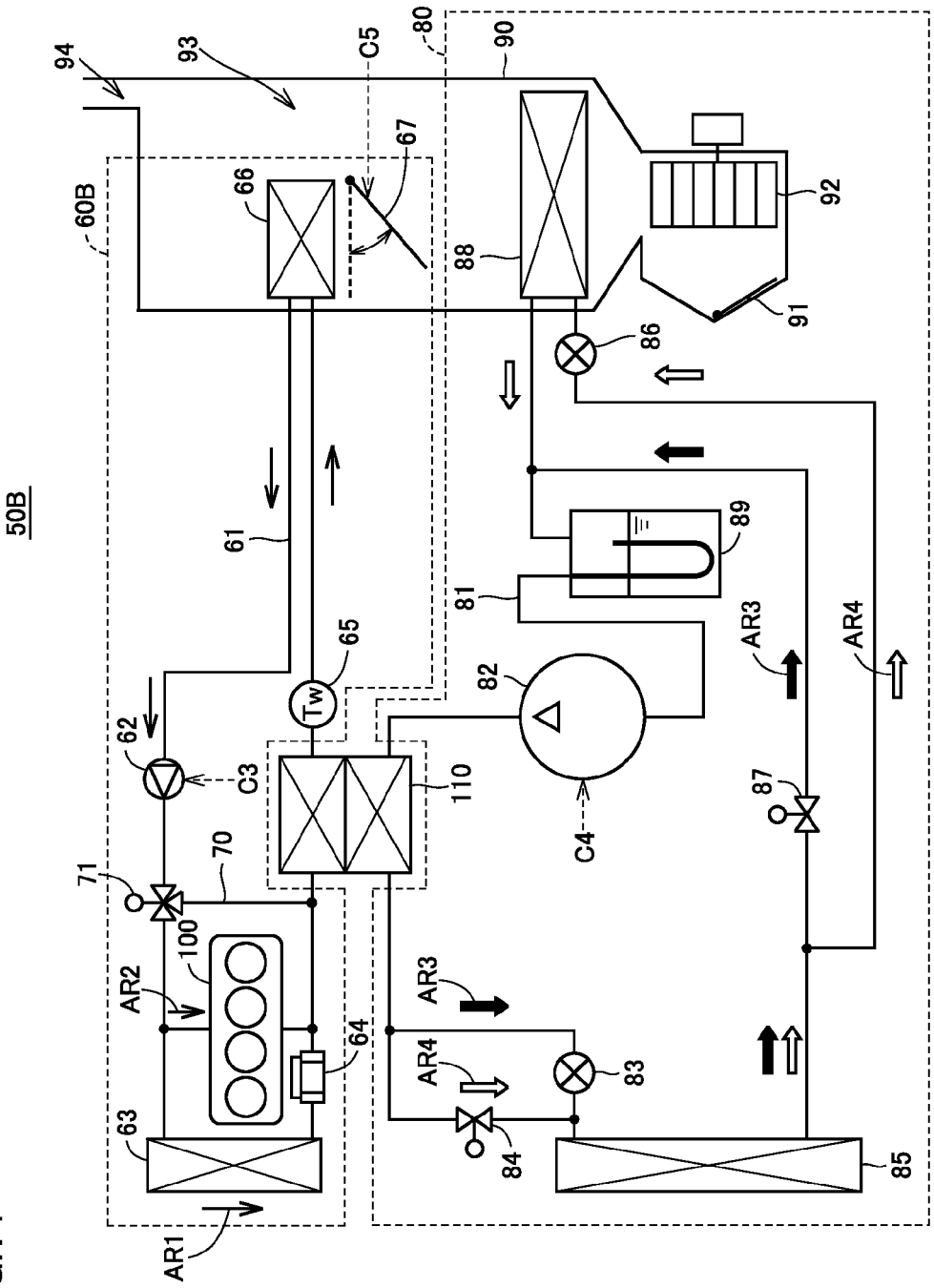
FIG. 14 is a block diagram illustrating in detail the configuration of a heat pump system of a fifth embodiment.

FIG. 14 is a block diagram illustrating the configuration of a heat pump system of the fifth embodiment. Referring to FIG. 14, heat pump system 50B differs from heat pump system 50 shown in FIG. 2 in that bypass path 70 and cross valve 71 are provided for causing the coolant to bypass engine 100. Since other elements of heat pump system 50B are equal to corresponding elements of heat pump system 50, description thereof will not be repeated.

Figure 15A:
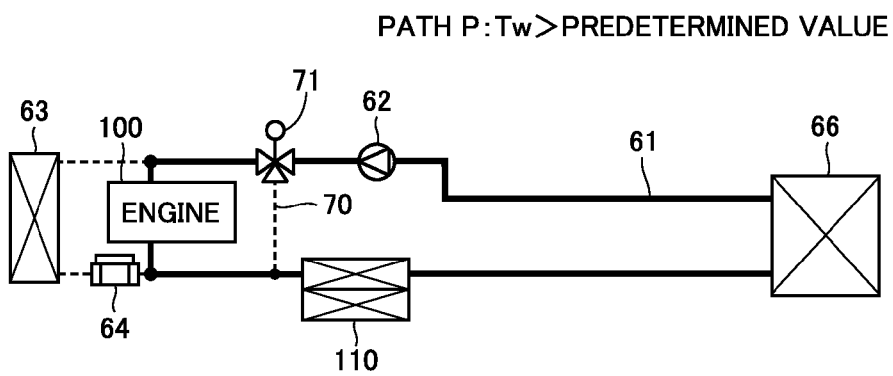
FIG. 15A is a diagram for explaining a coolant path when the temperature of the coolant is high.
Figure 15B:
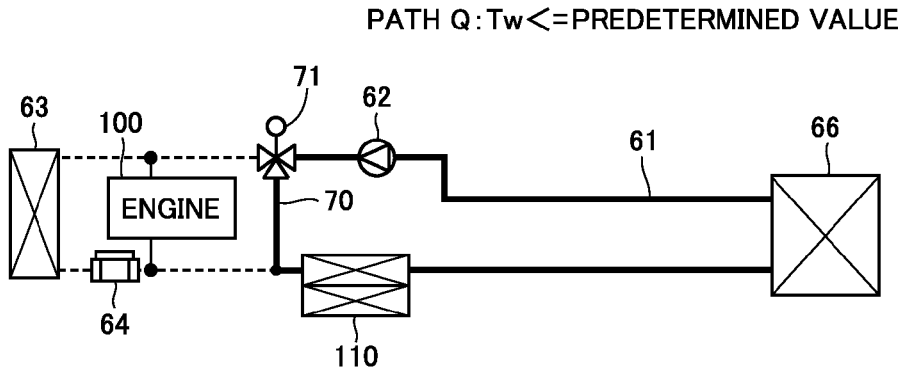
FIG. 15B is a diagram for explaining a coolant path when the temperature of the coolant is low.

FIGS. 15A and 15B are each a diagram for explaining a coolant path in accordance with coolant temperature Tw. FIG. 15A shows a path P when coolant temperature Tw is higher than a predetermined value. FIG. 15B shows a path Q when coolant temperature Tw is equal to or lower than the predetermined value.

Cross valve 71, when coolant temperature Tw is higher than the predetermined value, is controlled such that the coolant passes through and circulates in both engine 100 and heater core 66 (see path P). In contrast, if coolant temperature Tw is equal to or lower than the predetermined value at an initial period of the start of engine 100, for example, cross valve 71 is controlled such that the coolant circulates without passing through engine 100 (see path Q).

If coolant temperature Tw is equal to or lower than the predetermined value, the effect of accelerating warm-up of engine 100 will be little even if the coolant is passed through engine 100. Perhaps, engine 100 will be cooled with the coolant, and even more time will be required until warm-up of engine 100 is completed.

Thus, in this embodiment, the coolant is not passed through engine 100 until the coolant becomes warm (see path Q), and the coolant is passed through engine 100 after being heated (see path P). This prevents warm-up of engine 100 from being hindered by the coolant, which allows engine 100 to be warmed up quickly. Furthermore, when the coolant is not passed through engine 100, the amount of the coolant that needs to be heated by heat exchanger 110 is small, and thus, coolant temperature Tw rises easily. Therefore, the heating performance can be quickly obtained.

Figure 16:
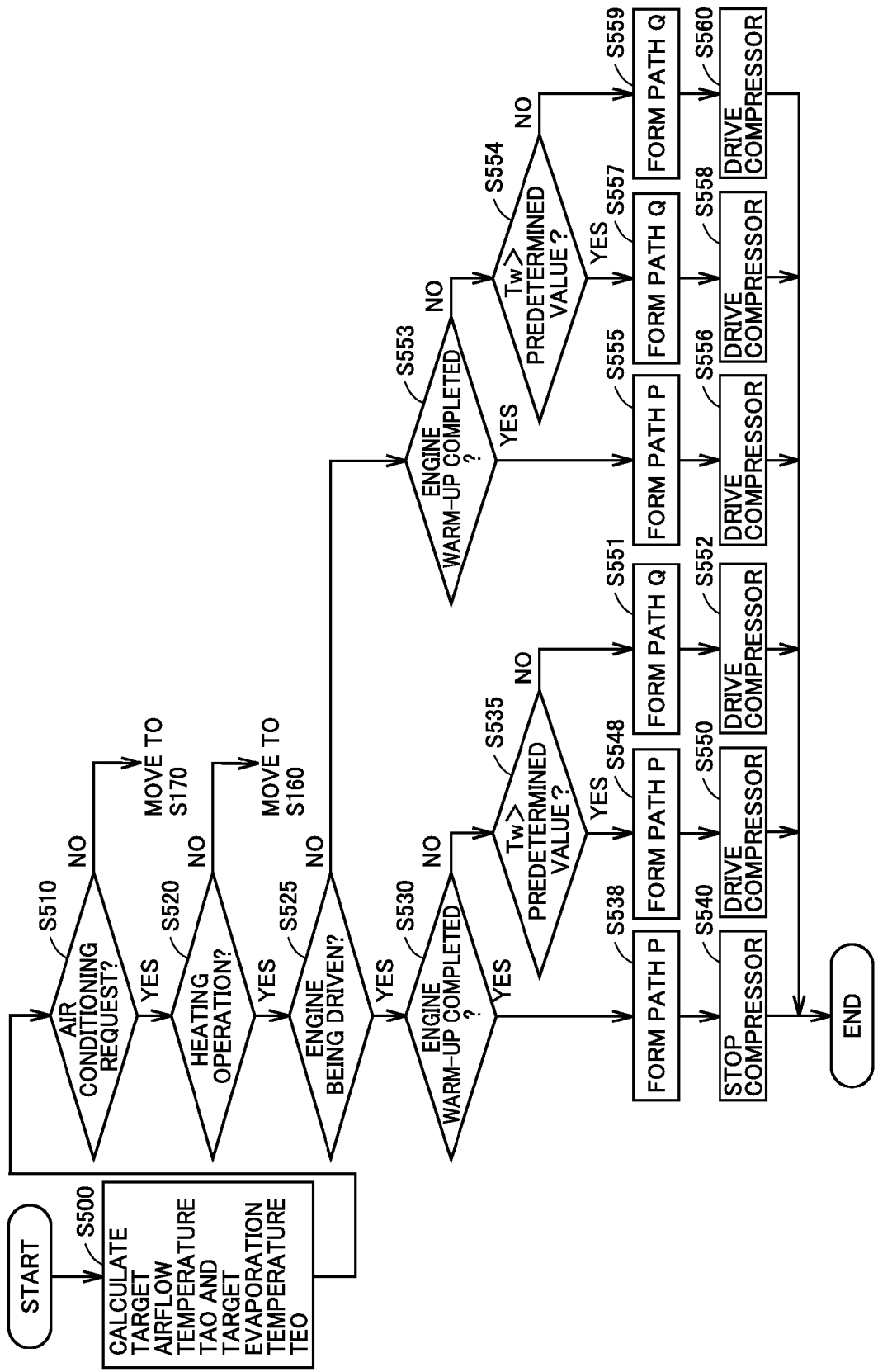
FIG. 16 is a flowchart for explaining heat pump system control processing of the fifth embodiment.

FIG. 16 is a flowchart for explaining control processing for heat pump system 50B of the fifth embodiment. Referring to FIG. 16, the processing in S500 to S520 is the same as the processing in S100 to S120, respectively, shown in FIG. 5, and thus, description thereof will not be repeated.

ECU 300 determines in S525 whether or not engine 100 is being driven. If engine 100 is being driven (YES in S525), the processing is moved to S530 where ECU 300 determines whether or not warm-up of engine 100 is completed.

If warm-up of engine 100 is completed (YES in S530), since the coolant can be heated with the heat of engine 100, ECU 300 controls cross valve 71 to form path P through which the coolant flows through engine 100 (S538). ECU 300 then stops compressor 82 (S540). This is because in many cases, the heating performance can be ensured with the heat of engine 100. Note that if sufficient heating performance cannot be ensured with only the heat of engine 100, compressor 82 may be driven.

On the other hand, if warm-up of engine 100 is not completed yet (NO in S530), ECU 300 determines whether or not coolant temperature Tw is higher than the predetermined value (S535).

When coolant temperature Tw is higher than the predetermined value (YES in S535), the coolant can be passed through engine 100 without hindering warm-up of engine 100, and thus, ECU 300 controls cross valve 71 to form path P (S548). ECU 300 then causes compressor 82 to be driven to execute the engine warm-up control (S550).

On the other hand, when coolant temperature Tw is equal to or lower than the predetermined value (NO in S535), warm-up of engine 100 will be hindered if the coolant is passed through engine 100, and thus, ECU 300 controls cross valve 71 to form path Q through which the coolant does not flow (S551). ECU 300 also causes compressor 82 to be driven (S552). When path Q is formed, the amount of the coolant that needs to be heated by heat exchanger 110 may be small, and thus, coolant temperature Tw can be increased quickly. This allows the heating performance to be ensured quickly.

If engine 100 is shut down in S525 (NO in S525), the processing is moved to S553 where ECU 300 determines whether or not warm-up of engine 100 is completed.

If warm-up of engine 100 is completed (YES in S553), since the coolant can be heated with the heat of engine 100, ECU 300 controls cross valve 71 to form path P through which the coolant flows through engine 100 (S555). ECU 300 then causes compressor 82 to be driven (S556). This is because, since engine 100 is shut down, continued heating performance cannot be ensured with only the heat of engine 100.

On the other hand, if warm-up of engine 100 is not completed yet (NO in S553), ECU 300 determines whether or not coolant temperature Tw is higher than the predetermined value (S554).

If coolant temperature Tw is higher than the predetermined value (YES in S554), ECU 300 therefore controls cross valve 71 to form path Q through which the coolant does not flow (S557). ECU 300 then causes compressor 82 to be driven (S550). While engine 100 is not sufficiently warmed up yet, coolant temperature Tw is high to some extent. Therefore, even if the coolant is passed through engine 100, it may be possible that coolant temperature Tw will not increase. Rather, the formation of path Q allows the amount of the coolant that needs to be heated by heat exchanger 110 to be small, and thus, coolant temperature Tw can be increased quickly.

Similarly, when coolant temperature Tw is equal to or lower than the predetermined value (NO in S554), ECU 300 controls cross valve 71 to form path Q (S559). ECU 300 then causes compressor 82 to be driven (S560). Since the amount of the coolant that needs to be heated by heat exchanger 110 may be small, coolant temperature Tw can be increased quickly.

If air conditioning request REQ is absent (NO in S510), the processing equal to the processing after S170 shown in FIG. 5 is executed. If the cooling operation is being requested (NO in S520), the processing equal to the processing in S160 is executed.

As described above, in the present embodiment, if warm-up of engine 100 is not completed while engine 100 is being driven (NO in S530), and if coolant temperature Tw is higher than the predetermined value (YES in S535), the coolant can be passed through engine 100 without hindering warm-up of engine 100, and thus, cross valve 71 is controlled such that the coolant flows through engine 100 (S548).

On the other hand, when coolant temperature Tw is equal to or lower than the predetermined value (NO in S535), cross valve 71 is controlled such that the coolant does not flow through engine 100 (S551). This prevents warm-up of engine 100 from being hindered by the coolant, which allows engine 100 to be warmed up quickly. Furthermore, since the amount of the coolant that needs to be heated by heat exchanger 110 may be small, the heating performance can be obtained quickly.

If warm-up of engine 100 is not completed yet while engine 100 is shut down (NO in S553), path Q through which the coolant does not flow through engine 100 is formed irrespective of coolant temperature Tw (S557, S559). Even if the coolant is passed through engine 100, the temperature of engine 100 is not sufficiently high, so that coolant temperature Tw is unlikely to be increased. Rather, because the coolant is not passed through engine 100, the amount of the coolant that needs to be heated by heat exchanger 110 is small, which allows coolant temperature Tw to be increased quickly.

Note that the foregoing first to fifth embodiments and the modification of the first embodiment can be combined as appropriate and carried out. For example, the control of the second embodiment in accordance with the CS mode and the CD mode (see FIG. 8) may be combined with the control based on target coolant temperature TWO of the modification of the first embodiment (see S175 in FIG. 5).

Although the present invention has been described and illustrated in detail, it is clearly understood that the same is by way of illustration and example only and is not to be taken by way of limitation, the scope of the present invention being interpreted by the terms of the appended claims.

What is claimed is:
1. A vehicle comprising:
an internal combustion engine;
a cooling system configured to cool said internal combustion engine with a coolant;
an air conditioning apparatus including a compressor that compresses a refrigerant, said compressor being driven in response to an air conditioning request to air condition a passenger compartment;
a heat exchanger that exchanges heat between said coolant and said refrigerant; and
a control unit that controls said air conditioning apparatus, even in the absence of said air conditioning request, said control unit causing said compressor to be driven to heat said coolant by radiation of heat from said refrigerant.
2. The vehicle according to claim 1, wherein
even in the absence of said air conditioning request, said control unit permits driving of said compressor when warm-up of said internal combustion engine is not completed.
3. The vehicle according to claim 1, further comprising:
a power storage device; and
a rotating electric machine configured to generate a driving force with at least one of output of said internal combustion engine and power of said power storage device, and generate power with the output of said internal combustion engine and store the power in said power storage device, wherein
said control unit is configured to selectively set a CS (Charge Sustaining) mode in which an SOC (State Of Charge) of said power storage device is maintained in a predetermined range or a CD (Charge Depleting) mode in which said SOC is consumed, and
in the absence of said air conditioning request, said control unit permits driving of said compressor when in said CS mode, while prohibiting driving of said compressor when in said CD mode.
4. The vehicle according to claim 3, wherein
in the absence of said air conditioning request and when in said CS mode, said control unit permits driving of said compressor when warm-up of said internal combustion engine is not completed, while said control unit prohibits driving of said internal combustion engine when warm-up of said internal combustion engine is completed.
5. The vehicle according to claim 1, wherein
in the presence of said air conditioning request, said control unit controls a rotation speed of said compressor based on a target airflow temperature of air blown into said passenger compartment, while in the absence of said air conditioning request, said control unit controls the rotation speed of said compressor based on a temperature of said coolant.
6. The vehicle according to claim 1, wherein
said control unit sets the rotation speed of said compressor variably depending on a heating operation of said air conditioning apparatus, a cooling operation of said air conditioning apparatus, and a stopped state of said air conditioning apparatus.

7. The vehicle according to claim 6, wherein
said rotation speed while said air conditioning apparatus is in said stopped state is set based on energy efficiency of said compressor.

8. The vehicle according to claim 1, wherein
said cooling system includes:
a heater core that exchanges heat between said coolant and air blown into said passenger compartment;
a bypass path formed to allow said coolant to circulate along a path through which said coolant does not flow through said heater core; and
a switching unit that switches flow of said coolant to any one of said heater core and said bypass path, and
during the cooling operation of said air conditioning apparatus, said control unit controls said switching unit such that said coolant flows through said bypass path.

9. The vehicle according to claim 8, wherein
said cooling system further includes an adjusting unit configured to adjust an amount of air passing through said heater core, and
during the cooling operation of said air conditioning apparatus, when said control unit controls said adjusting unit such that part of the air blown into said passenger compartment passes through said heater core, said control unit controls said switching unit such that said coolant flows through said heater core, while
during the cooling operation of said air conditioning apparatus, when said control unit controls said adjusting unit such that the air blown into said passenger compartment does not pass through said heater core, said control unit controls said switching unit such that said coolant flows through said bypass path.

10. The vehicle according to claim 8, wherein
while said air conditioning apparatus is in a stopped state, said control device controls said switching unit such that said coolant flows through said bypass path.

11. The vehicle according to claim 1, further comprising:
a power storage device; and
a rotating electric machine configured to generate a driving force with at least one of output of said internal combustion engine and power of said power storage device, and generate power with the output of said internal combustion engine and store the power in said power storage device, wherein
said control device sets a rotation speed of said compressor to be lower as the SOC of said power storage device decreases.

12. The vehicle according to claim 1, wherein
said cooling system includes:
a heater core that exchanges heat between said coolant and air blown into said passenger compartment;
a bypass path formed to allow said coolant to circulate along a path through which said coolant does not flow through said internal combustion engine;
a switching unit that switches flow of said coolant to any one of said internal combustion engine and said bypass path; and
a temperature detecting unit that detects a temperature of said coolant, wherein
said control device controls said switching unit such that said coolant passes through said internal combustion engine when a temperature of said coolant exceeds a predetermined value, while said control device controls said switching unit such that said coolant flows through said bypass path when the temperature of said coolant falls below said predetermined value.

13. A method for controlling a vehicle,
said vehicle including:
an internal combustion engine;
a cooling system configured to cool said internal combustion engine with a coolant;
an air conditioning apparatus including a compressor that compresses a refrigerant, said compressor being driven in response to an air conditioning request to air condition a passenger compartment; and
a heat exchanger that exchanges heat between said coolant and said refrigerant,
said method including the steps of:
determining the presence or absence of said air conditioning request; and
even if it is determined that said air conditioning request is absent, causing said compressor to be driven to heat said coolant by radiation of heat from said refrigerant.

14. The method for controlling the vehicle according to claim 13, wherein
said heating step includes, even in the absence of said air conditioning request, permitting driving of said compressor when warm-up of said internal combustion engine is not completed.

* * * * *